(12) United States Patent
Palmer et al.

(10) Patent No.: US 11,885,394 B2
(45) Date of Patent: Jan. 30, 2024

(54) DRIVE SPROCKET

(71) Applicant: NEW MOTION LABS LTD., Exeter (GB)

(72) Inventors: Josh Daniel Palmer, London (GB); Lucas Lobmeyer, Loehnberg (DE); Marcel Fowler, London (GB)

(73) Assignee: NEW MOTION LABS LTD., Exeter (GB)

( * ) Notice: Subject to any disclaimer, the term of this patent is extended or adjusted under 35 U.S.C. 154(b) by 0 days.

(21) Appl. No.: 18/151,301

(22) Filed: Jan. 6, 2023

(65) Prior Publication Data

US 2023/0167878 A1   Jun. 1, 2023

Related U.S. Application Data

(63) Continuation of application No. 16/932,397, filed on Jul. 17, 2020, now Pat. No. 11,603,906, which is a
(Continued)

(30) Foreign Application Priority Data

Jul. 13, 2017  (GB) ...................... 1711342
Sep. 28, 2017  (GB) ...................... 1715782
Oct. 24, 2017  (GB) ...................... 1717436

(51) Int. Cl.
*F16G 13/06*   (2006.01)
*B62M 9/00*   (2006.01)
(Continued)

(52) U.S. Cl.
CPC ............... *F16G 13/06* (2013.01); *B62M 9/00* (2013.01); *F16H 7/06* (2013.01); *F16H 2007/185* (2013.01)

(58) Field of Classification Search
CPC .. F16G 13/06; B62M 9/00; F16H 7/06; F16H 2007/185
(Continued)

(56) References Cited

U.S. PATENT DOCUMENTS 2,489,039 A   11/1949   Law
4,290,762 A    9/1981   Lapeyre
(Continued)

FOREIGN PATENT DOCUMENTS

CN   102537210    7/2012
DE   102014206896   10/2014
(Continued)

OTHER PUBLICATIONS

Intellectual Property Office, Search Report, GB Application No. 1717436.8, dated Jan. 5, 2018.
(Continued)

*Primary Examiner* — Gene O Crawford
*Assistant Examiner* — Emily R Kincaid
(74) *Attorney, Agent, or Firm* — Saliwanchik, Lloyd & Eisenschenk (57) ABSTRACT

A drive sprocket comprising a plurality of teeth for meshing with a drive member to transmit rotary motion, the drive member including a plurality of engagement pockets engaging the teeth of the drive sprocket, wherein each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface, wherein the first contact location is radially offset from the second contact location.

17 Claims, 8 Drawing Sheets

Related U.S. Application Data continuation-in-part of application No. 16/629,918, filed as application No. PCT/GB2018/000105 on Jul. 10, 2018, now Pat. No. 11,421,756.

(51) Int. Cl.
  *F16H 7/06* (2006.01)
  *F16H 7/18* (2006.01)

(58) Field of Classification Search
  USPC ......................................................... 474/152
  See application file for complete search history.

(56) References Cited

U.S. PATENT DOCUMENTS

| | | | |
|---|---|---|---|
| 4,378,719 | A | 4/1983 | Burgess |
| 6,090,003 | A | 7/2000 | Young |
| 6,526,740 | B1 | 3/2003 | Tanemoto et al. |
| 2004/0185977 | A1* | 9/2004 | Young ............... F16H 55/30 |
| | | | 474/205 |
| 2006/0068959 | A1 | 3/2006 | Young et al. |
| 2008/0176688 | A1* | 7/2008 | Sakura ............... F16H 7/06 |
| | | | 474/141 |
| 2009/0286639 | A1 | 11/2009 | Sakura et al. |
| 2010/0203992 | A1 | 8/2010 | Botez |
| 2013/0225345 | A1 | 8/2013 | Bodensteiner et al. |
| 2014/0057750 | A1 | 2/2014 | Yokoyama |
| 2014/0141913 | A1* | 5/2014 | Yokoyama ............ F16G 13/18 |
| | | | 474/206 |
| 2016/0348755 | A1 | 12/2016 | Ritz et al. |

FOREIGN PATENT DOCUMENTS

| | | |
|---|---|---|
| EP | 0171561 | 2/1986 |
| EP | 0611000 | 8/1994 |
| EP | 1033059 | 9/2000 |
| EP | 1120586 | 8/2001 |
| GB | 2351543 | 1/2001 |
| JP | 3501493 | 3/2004 |
| WO | 99/49239 | 9/1999 |

OTHER PUBLICATIONS

International Search Report dated Oct. 24, 2018 for PCT/GB2018/000105.

Chinese Search Report, Chinese Application No. 201880046123.5.

\* cited by examiner

DRIVE SPROCKET

CROSS-REFERENCE TO RELATED APPLICATIONS

The present application is a continuation application of U.S. patent application Ser. No. 16/932,397, filed Jul. 17, 2020, which is a continuation-in-part (CIP) application of U.S. patent application Ser. No. 16/629,918, filed Jan. 9, 2020, now U.S. Pat. No. 11,421,756, issued Aug. 23, 2022, which is a national stage application of International Patent Application No. PCT/GB2018/000105, filed Jul. 10, 2018, which claims priority to Great Britain Application No. 1711342.4, filed Jul. 13, 2017, Great Britain Application No. 1715782.7, filed Sep. 28, 2017, and Great Britain Application No. 1717436.8, filed Oct. 24, 2017, the disclosures of all of which are incorporated herein by reference in their entirety, including any figures, tables, and drawings.

BACKGROUND TO THE INVENTION

This invention relates to a drive sprocket, and particularly, but not exclusively, to a drive sprocket for use with a drive member, wherein the drive sprocket comprises a plurality of teeth. The invention also relates to a transmission system comprising a drive sprocket and a drive member, and a drive member forming part of a transmission system.

Drive sprockets, or pulleys, having a plurality of teeth for use with drive members such as power transmission chains or belts are well known, and often take the form of a substantially circular sprocket having a plurality of teeth spaced apart around an outer circumference of the sprocket.

A variety of different drive members may be used with such drive sprockets.

A first type of known drive member is a power transmission chain in the form of a roller chain. The roller chain has a plurality of engaging formations for enabling engagement with the drive sprocket. The engaging formations are in the form of receiving formations, for receiving the teeth of the drive sprocket. An example of a use of a roller chain is for a bicycle. The roller chain for a bicycle passes around a front drive sprocket in the form of a crank drive sprocket, and it also passes around a rear drive sprocket in the form of a gear wheel. The known roller chains are also able to be used in many other different types of apparatus including, for example, tricycles, motorcycles and chain saws.

A second type of known drive member is a power transmission chain comprising a silent chain. The silent chain also has a plurality of engaging formations for enabling engagement with the drive sprocket. The engaging formations are in the form of tooth formations for being received in receiving recesses formed between adjacent teeth on the drive sprocket. The silent chain is used for high torque applications which need high efficiency and the transfer of a lot of power.

Typical of such applications is the use of a silent chain as a timing chain for engines. The silent chain is also often referred to as a HY-VO chain.

A third type of know drive member is a belt which is adapted to engage with the teeth of a sprocket.

As is well known, a drive member enables transmission of power between drive sprockets. Known drive sprockets may drive the drive member as in the case of a front sprocket drive sprocket on a bicycle, or the drive sprockets may be driven by the drive member as in the case of rear gear drive sprockets on a bicycle.

It is known that power transmission chains are formed by chain links which are pivotally contacted together by pivots which extend transversely completely across the chain link.

The known drive members and known drive sprockets do not transmit power as efficiently as would be desired. More specifically, the known drive members invariably make contact with the drive sprockets under significant loads, and in such situations, the drive members frequently tend to move relative to the teeth of the sprocket whilst maintaining contact under this high loading. The result is that the known power transmission chains do not work efficiently on the drive sprockets.

SUMMARY OF THE INVENTION

According to a first aspect of the present invention there is provided a drive sprocket comprising a plurality of teeth for meshing with a drive member to transmit rotary motion, the drive member including a plurality of engagement pockets engaging the teeth of the drive sprocket, wherein each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface, wherein the first contact location is radially offset from the second contact location.

By means of the present invention, during use of the drive sprocket, each tooth of the sprocket will engage with the drive member at two contact locations on opposite sides of each tooth. In addition, the first contact location will, during use be radially offset from the second contact location.

Such an arrangement reduces the stress on the sprocket during use thereby reducing the wear and tear on the drive sprocket as well as the frictional losses, thereby increasing transmission efficiency.

In addition, the radial offset of the first and second contact locations helps to prevent the engagement pocket of the drive member from becoming wedged, or stuck, on a tooth during use of the drive sprocket.

By means of the present invention, therefore, secure engagement of the pitch pocket with the tooth may be achieved as the drive member makes contact with the drive sprocket. In addition, the stress on the drive sprocket as the load is transferred between the drive sprocket and the drive member is distributed to reduce localised peak stresses. Further, disengagement of the pitch pocket from the tooth may be reliably achieved.

In embodiments of the invention, each tooth has a front face and a back face, the shape of which front and back faces being defined by the first and second sides, wherein the shape of each face is symmetrical about a radial axis of the tooth, and the sides of the faces are defined at least partially by two arcs. An advantage of having a tooth where the shape of the front and back faces is symmetrical, is that it is possible for the drive sprocket to rotates in both a forward and a reverse direction. A symmetric tooth also enables applications with only one drive direction to handle torque reversal during operation. This results in the drive sprocket being more adaptable to different uses.

In embodiments of the invention, each arc defines a side of a tooth and has a radius of R, the centres of the arcs being at a distance x from one another, and at a perpendicular distance, y, from the centre of the drive sprocket, and wherein the centre of each arc is at ±x/2,y.

In embodiments of the invention, adjacent teeth are spaced apart from one another by a connecting portion of the sprocket.

In such embodiments of the invention, the tolerance of a transmission system incorporating a drive sprocket according to embodiments of the invention to dimensional variations within the system's components will be increased.

According to a second aspect of the present invention there is provided a transmission system comprising a drive sprocket according to embodiments of the first aspect of the invention, and further comprising a drive member, which drive member is adapted to engage with the drive sprocket.

In embodiments of the invention, the drive member comprises a plurality of engagement pockets, each of which engagement pockets comprises a first engaging surface and a second engaging surface spaced apart from the first engaging surface, the first and second engaging surfaces forming an engagement surface pair, which pair is rotatable about a rotational axis, wherein adjacent engagement pockets are connected to one another by connecting members.

In embodiments of the invention, adjacent engagement pockets are connected to one another by a primary link, which primary link is rotatable about the rotational axis of the engagement surface pair.

In such embodiments of the invention, the drive member may engage with the teeth of the drive sprocket, such that each engagement pocket is adapted to receive a tooth of the drive sprocket and to engage with the tooth at first and second engaging surfaces. Because adjacent engagement pockets are connected to one another by a primary link which is rotatable about the rotational axis of the engagement surface pair, the tooth will thus mesh to the engagement pocket such that the first contact location engages with the first engaging surface, and the second contact location engages with the second engaging surface.

The tooth is thus securely held by the engagement pocket such that little or no movement of the tooth relative to the pocket is possible once the tooth has meshed to the engagement pocket. In addition, because the first and second contact locations are radially offset relative to one another during use of the transmission system, the tooth is less likely to become stuck, or wedged in the engagement pocket compared to when there is no radial offset.

In embodiments of the invention, each primary link is rotatable about the rotational axis of each adjacent engagement pocket. This facilitates the articulation of the drive member.

In embodiments of the invention, the drive member comprises a plurality of first primary links which are coplanar with one another and are pivotally connected to one another at first and second pivot points, which pivot points are spaced apart from one another such that adjacent first primary links are pivotable about the axis of rotation of each adjacent engagement pocket.

Such an arrangement may be desirable when the drive member comprises a power transmission chain, for example.

In embodiments of the invention, the drive member comprises a plurality of second primary links coplanar with one another and pivotally connected to one another at first and second pivot points, which pivot points are spaced apart from one another such that adjacent second primary links are pivotable about the axis of rotation of each adjacent engagement pocket, wherein the first primary links are connected to the second primary links such the first and second primary links are substantially parallel to one another, and the first pivot points of the first links are coaxial with the second pivot points of the second links, and the second pivot points of the first links are coaxial with the first pivot points of the second links.

In embodiments of the invention, each engagement pocket comprises first and second transverse members each having a first end and a second end, the first and second transverse members being spaced apart from one another, wherein the first and second engaging surfaces are formed on the first and second transverse members respectively.

In such embodiments, the secondary links may be parallel with the primary links, and the transverse members may be substantially perpendicular to the primary and secondary links.

In embodiments of the invention, each engagement pocket comprises a first secondary link positioned at, or close to the first ends of the first and second transverse members, and a second secondary link positioned at, or close to the second ends of the transverse members, wherein the first and second secondary links are parallel with one another.

In such embodiments of the invention, first and second secondary links may be positioned opposite one another with the first and second transverse members extending substantially parallel to one another and substantially perpendicularly to the first and second secondary links. Each engagement pocket is thus defined by the first and second secondary links and the first and second transverse members.

In embodiments of the invention, the first and second transverse members each have a radius r, wherein the distance between the first and second transverse members of an engagement pocket is p2, and the distance between first and second pivot points of a primary link is p.

In embodiments of the invention the first and second transverse members comprise first and second rollers respectively, each of which first and second rollers may have a radius r and may be rotatable about their respective axes. In other embodiments, the first and second transverse members may comprise first and second pins respectively, each of which first and second pins may have a radius of r and may not be rotatable. In still other embodiments, the first and second transverse members comprise first and second curved surfaces each surface having a radius of curvature of r.

According to a third aspect of the invention, there is provided a drive member forming part of a transmission system according to embodiments of the invention.

BRIEF DESCRIPTION OF THE DRAWINGS

Embodiments of the invention will now be further described by way of example only with reference to the accompanying drawings in which.

DETAILED DESCRIPTION

Figure 1:
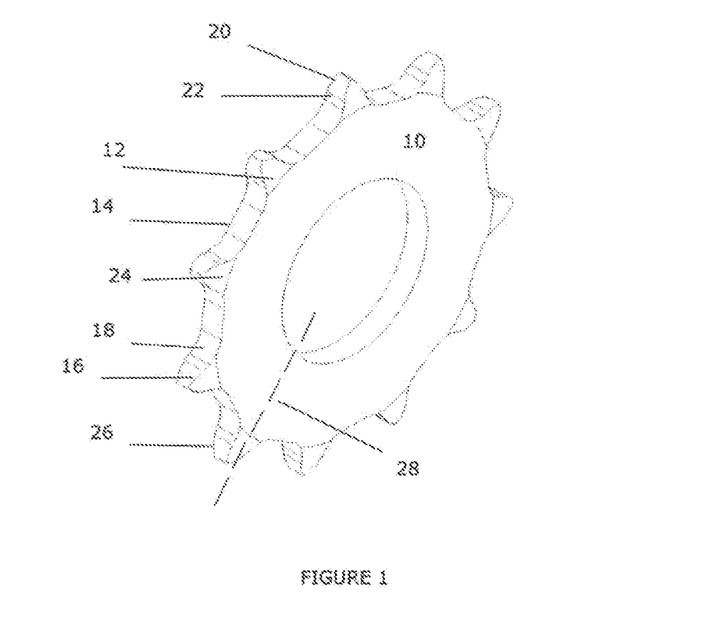
FIG. 1 is a schematic representation of a drive sprocket according to an embodiment of the first aspect of the invention.
Figure 2:
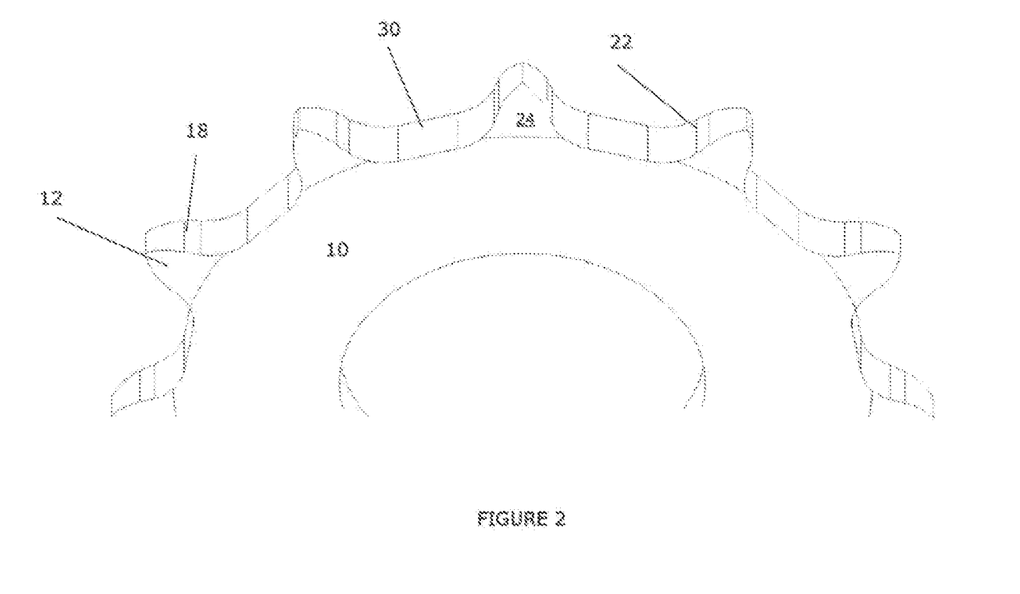
FIG. 2 is a detailed representation of a part of the drive sprocket of FIG. 1.
Figure 3:
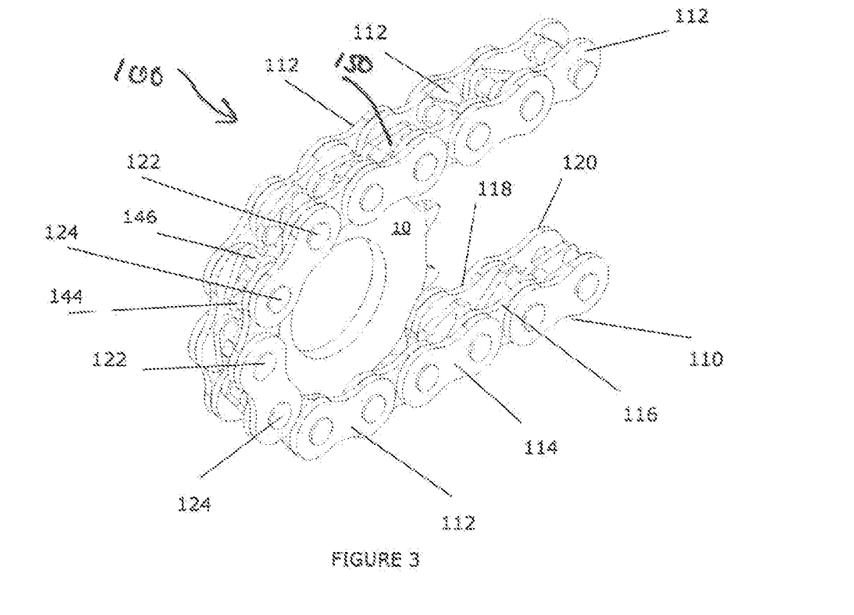
FIG. 3 is a schematic representation of the drive sprocket of FIGS. 1 and 2 engaged with a drive member according to embodiments of the third aspect of the invention and comprising a power chain, to form a transmission system according to embodiments of the second aspect of the invention.
Figure 4:
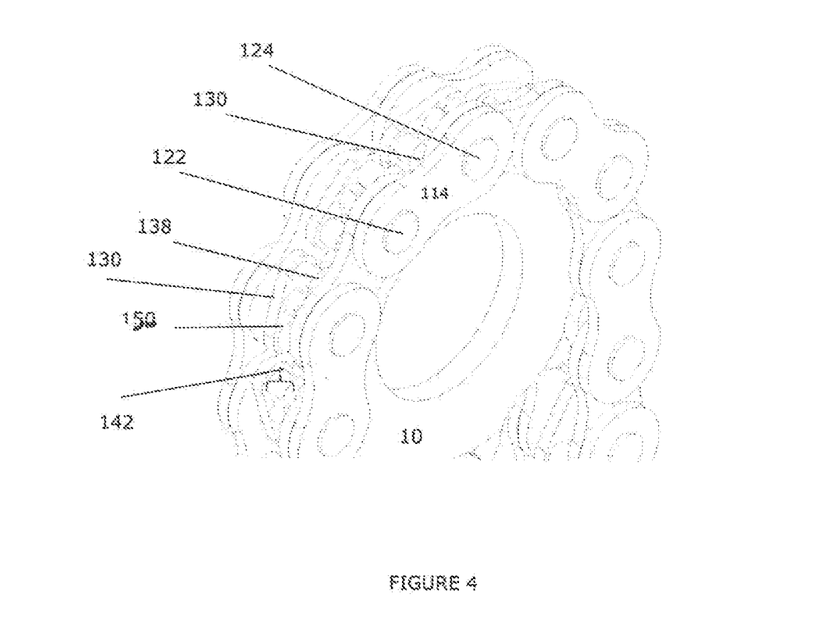
FIG. 4 is a more detailed schematic representation of the transmission system of FIG. 3.
Figure 5:
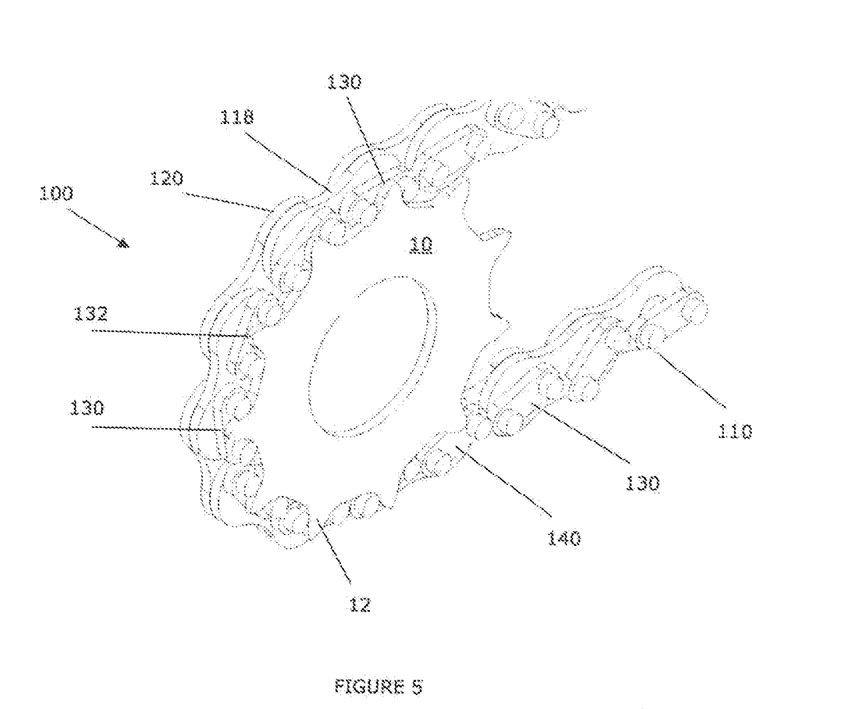
FIG. 5 is a schematic representation of the transmission system of FIGS. 3 and 4 with the primary links from one side removed.

Referring initially to FIGS. 1 and 2, a drive sprocket according to an embodiment of the first aspect of invention is designated generally by the reference numeral 10.

The sprocket 10 comprises a plurality of teeth 12 that are spaced apart from one another around an outer circumference 14 of the sprocket 10.

Each tooth has a tooth profile defined by a first side 16 comprising a first engagement surface 18, and an opposite second side 20 comprising a second engagement surface 22. Each tooth further comprises a front face 24 and a back face 26, the shape of which faces being defined by the first and second sides 18, 20, which in this embodiment comprise first and second engagement surfaces. The shape of each face is symmetrical about a radial axis 28 extending along the length of each tooth.

The shape of each side 16, 20 is defined at least partially by an arc. Because each tooth 12 is symmetrical about the axis 28, the dimensions of the arcs forming all sides is the same.

Figure 11:
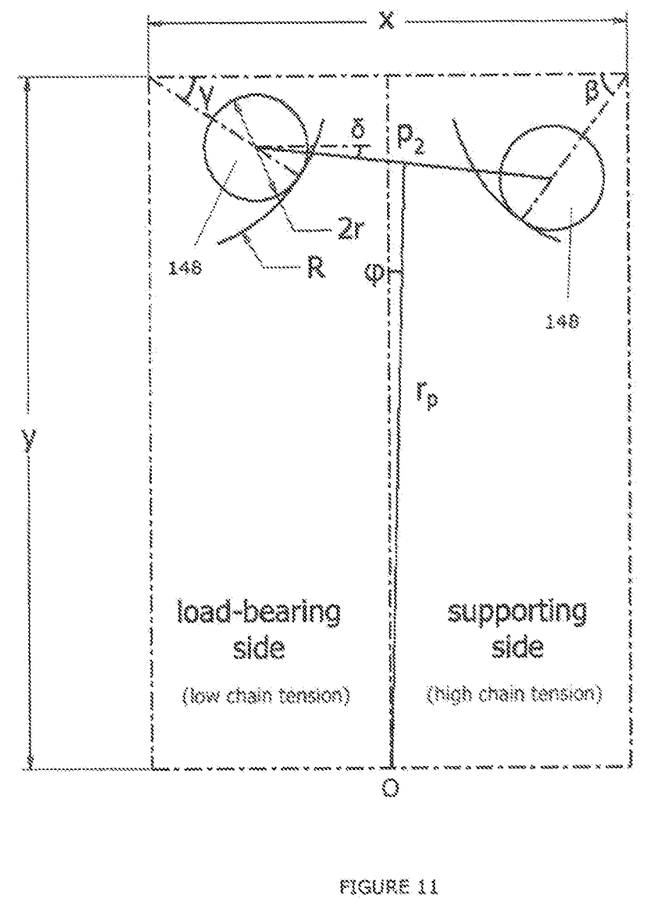
FIG. 11 is a schematic representation showing the position of the arc centres defining the sides of the teeth of the drive sprocket relative to the centre of the drive sprocket.

Referring now to FIG. 11, it can be seen that in this embodiment, each arc defining a side of a tooth 12 has a radius of R. The centres of the arcs are at a distance x from one another, and at a perpendicular distance y, from the centre of the drive sprocket. The centre of each arc is at ±x/2,y. Adjacent teeth 12 are separated from one another to define a connecting portion 30, as shown in FIG. 2, for example. In the illustrated embodiment, the connecting portion is substantially flat. However, it is to be understood that in other embodiments of the invention the connecting portion may not be flat, or there may not be a connecting portion at all.

Turning now to FIGS. 3 to 8, a transmission system according to an embodiment of the second aspect of the invention is designated generally by the reference numeral 100. The transmission system 100 comprises the sprocket 10 illustrated in FIGS. 1 and 2 and described hereinabove. The transmission system 100 further comprises a power transmission chain 110. The power transmission chain 110 is adapted to engage with the sprocket 10 as will be described hereinbelow in order to enable transmission of power between the drive sprocket 10 and another drive sprocket (not shown).

Figure 6:
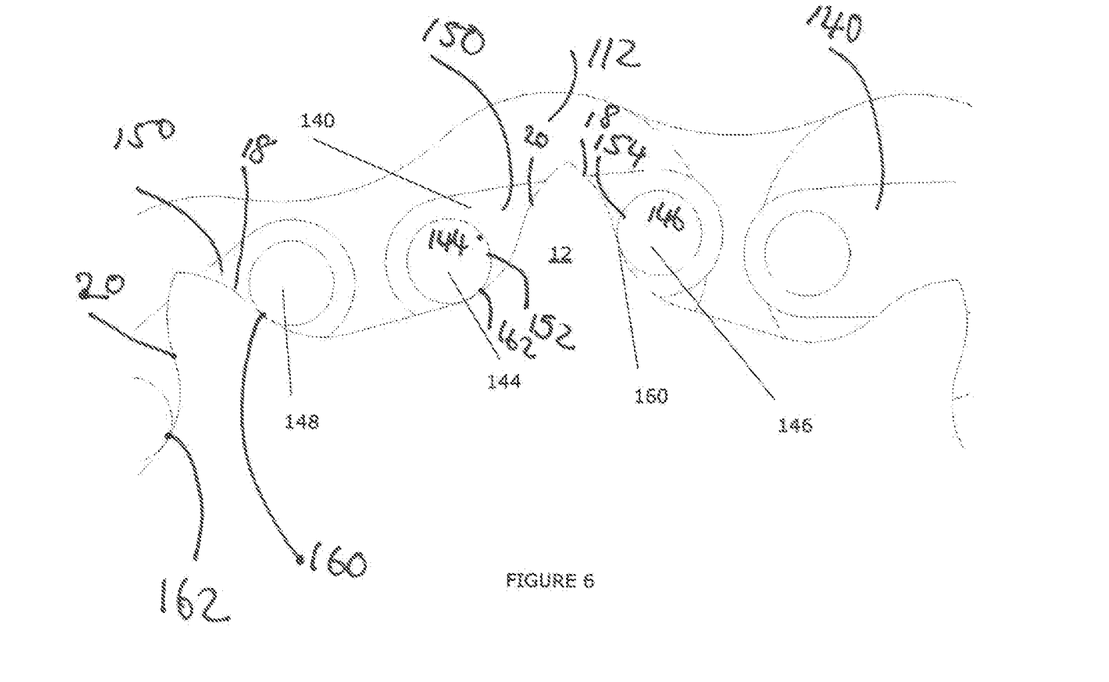
FIGS. 6, 7 and 8 are schematic representations of part of the transmission system as shown in FIG. 5 showing the position of the secondary links during rotation of the drive sprocket.
Figure 7:
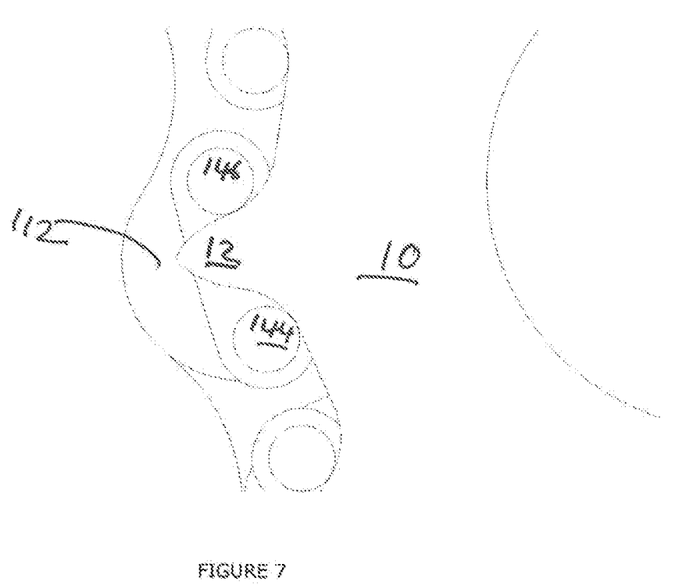
Figure 8:
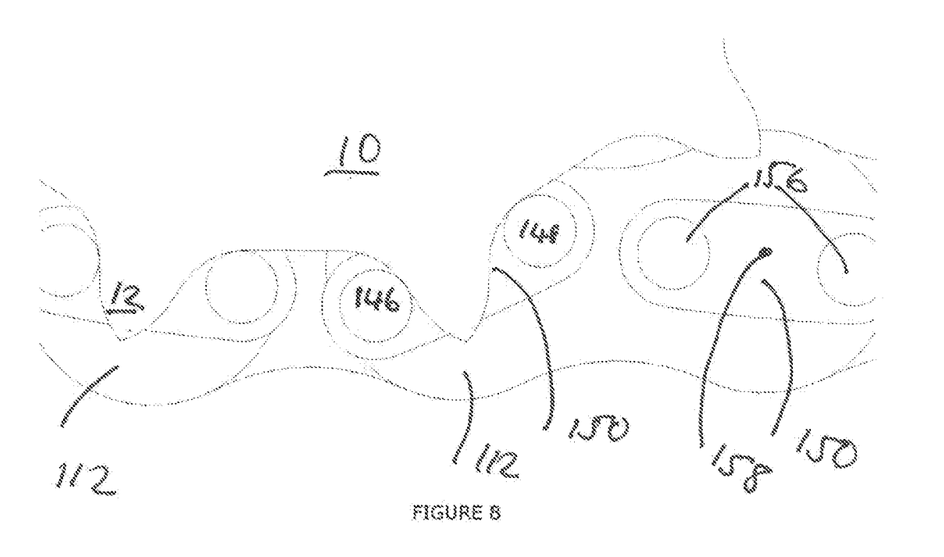

As shown particularly in FIGS. 6, 7 and 8 for example, the power transmission chain 110 comprises a plurality of engagement pockets 150 extending along the chain 110. Each engagement pocket 150 comprises a first engaging surface 152, and a second engaging surface 154 which is spaced apart from the first engaging surface 152. The first and second engaging surfaces 152, 154 together form an engaging surface pair 156.

Each engaging surface pair 156 is rotatable about a rotational axis 158. Adjacent engagement pockets 150 are connected to one another by at least one primary link 112, which primary link 112 is rotatable about the rotational axis 158.

In this embodiment there is a set of first primary links 114 which are co-planar with one another, a set of second primary links 116 which are co-planar with one another, a set of third primary links 118 which are co-planar with one another and a set of fourth primary links 120 which are also co-planar with one another. Each set of primary links is substantially parallel with each other set of primary links.

The primary links 112 in a particular set, which are co-planar to one another, are also pivotally connected to one another. Each primary link 112 has a first pivot point 122, and a second pivot point 124, the first and second pivot points 122 and 124 being spaced apart from one another along each primary link 112, such that adjacent primary links 112 are pivotable about the first and second primary pivot points 122, 124.

In the illustrated embodiment of the invention, the first 114 and second 116 primary links are connected to and abut one another such that the first pivot point 122 of a first primary link 114 is coaxial with the second pivot point 124 of a second primary link 116, and vice versa.

Similarly, the third 118 and fourth 120 primary links are connected to and abut one another such that the first pivot point 122 of a third primary link 118 is coaxial with the second pivot point 124 of a fourth primary link 120, and vice versa.

The power transmission chain 110 further comprises a plurality of secondary links 130 each of which secondary links is adapted to rotate substantially about the rotational axis 158 of the respective engagement pocket 150. Each secondary link 130 is positioned to be substantially parallel with a respective primary link 112 such that the rotational axis 158 of a particular engagement pocket 150 is coaxial with the first 122, or second 124, pivot points of the corresponding primary links 112. This in turn means that adjacent primary links 112 are pivotable about the axis of rotation 158.

In this embodiment, the plurality of secondary links 132 comprises a plurality of first secondary links 138, and a plurality of second secondary links 140. Each first secondary link 138 abuts a second primary link 116, and each second secondary link 140 abuts a third primary link 118.

In this embodiment, two first secondary links 138 abut each second primary link 116, and two second secondary links 140 abut each third primary link 118.

In this embodiment of the invention, the first secondary links 138 are substantially coplanar with one another, and the second secondary links 140 are substantially coplanar with one another, the first secondary links 138 are spaced apart from the second secondary links 140 such that each first secondary link 138 faces a corresponding second secondary link 140 to form a pair of secondary links 142.

In this embodiment, each engagement pocket 150 comprises first and second transverse members 144, 146, which are spaced apart from one another and on which the first and second engaging surfaces 152, 154 respectively, are formed. The first and second transverse members 144, 146 extend transversely between the corresponding first and second secondary links forming the pair. The transverse members 144, 146 thus connect the secondary links together.

In this embodiment, the first and second transverse members 144, 146 each comprise a roller 148. In other embodiments, each transverse member 144, 146 may comprise a pin.

The space defined between the first and second transverse members of a secondary link forms an engagement pocket 150. The engagement pockets 150 are shaped and positioned to receive and engage with a tooth 12 of the sprocket 10, as shown in the Figures.

In use of the transmission system 100, a tooth 12 of the drive sprocket 10 will mesh to the engagement pocket 150 at a first contact location 160 on the first engagement surface 18 and also at a second contact location 162 on the second engagement surface 20, as shown in FIG. 6, for example. Once engaged, the first contact location 160 will engage with the first engaging surface 152 of the engagement pocket 150, and the second contact location 162 will engage with the second engaging surface 154 of the engagement pocket 150.

Due to the inter-relationship between the primary links and secondary links as explained hereinabove together with the transverse members 144, 146 and the features of the drive sprocket 10, during use of the transmission system 100 the first contact location 160 is radially offset from the second contact location 162.

This in turn results in the rollers 148 maintaining contact with the first and second engagement surfaces 18, 20 of each corresponding tooth 12, and each secondary link 130 sitting at an offset angle such that one roller 148 sits radially higher on one side the tooth 12 than the roller 148 on the other side of the tooth.

The geometry of the teeth 12 and of the transmission chain 110 will now be described in more detail with particular reference to FIGS. 9 to 13.

Figure 9:
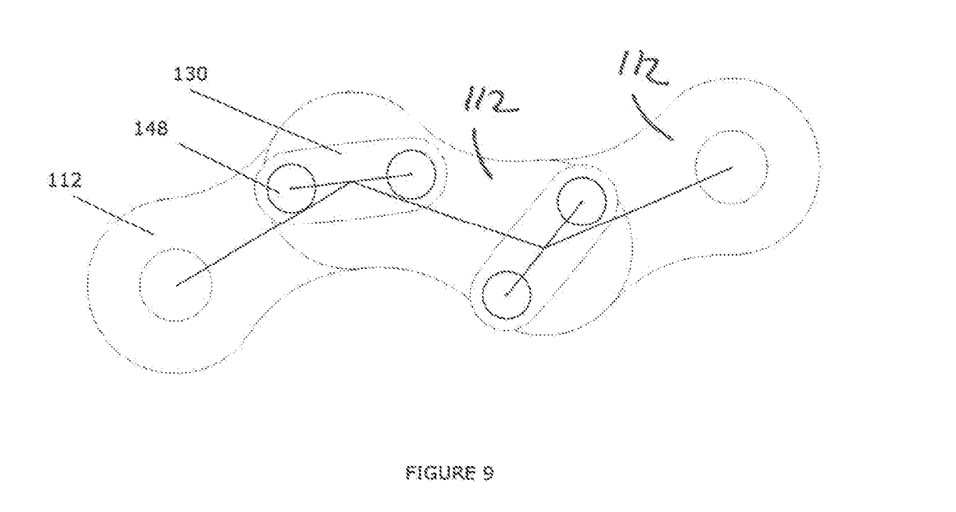
FIGS. 9 and 10 are schematic representations showing dimensions of the primary and secondary links of the transmission chain.
Figure 10:
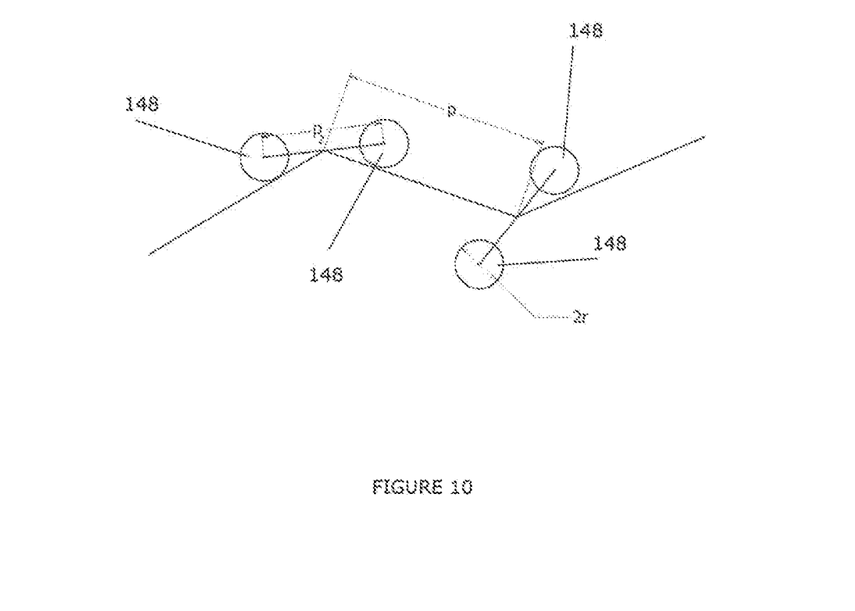

Referring initially to FIGS. 9 and 10 a portion of the transmission chain 110 is illustrated schematically.

As can be seen, the distance between first and second pivot points 122, 124 of a primary link 112 is p, the distance between the axes of first and second transverse members 144, 146 is p2, and the radius of each roller 148 is r.

Referring now to FIG. 11, according to Cartesian coordinates where the origin is at the sprocket centre and the centreline of the tooth is parallel with the y axis:

A symmetrical tooth geometry is proposed with two arcs of radius R with arc centres at $$\left(\pm\frac{x}{2}, y\right),$$

where, R, x, & y are defined such that when the chain is articulated around the sprocket and a load is applied to the chain:
1. the rollers of each secondary link maintain contact with the two arcs of each corresponding tooth, and;
2. the secondary links sit at an offset angle such that one roller sits higher on one side of the tooth than the roller on the other side of the tooth.

Furthermore, straight lines of length l extend above the tooth from the ends of the arcs towards the centreline at an angle, γ, relative to the tooth centreline such that as the chain wears, causing the pitch, p, of the chain to elongate and the corresponding pitch circle radius, $r_p$, to increase:
1. contact can be maintained with the tooth by both rollers, and;
2. the normal contact force acting on the load-bearing upper roller remains parallel to the tensile force in the primary link on the high-tension side of the chain.

Figure 12:
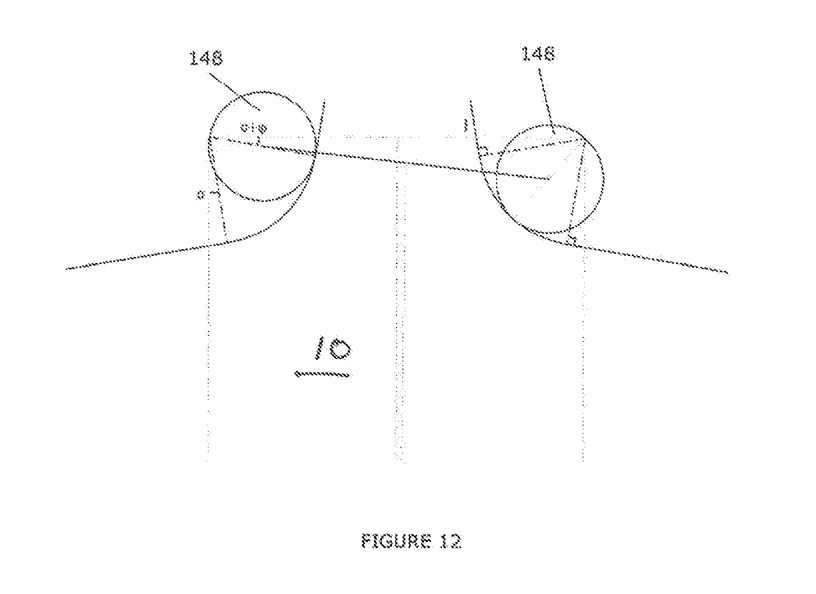
FIG. 12 is a schematic representation showing the radial offset of the first and second contact locations of a tooth of the drive sprocket of FIG. 1; and, FIG. 13 is a schematic diagram showing the dimensions of the drive sprocket shown in FIGS. 1 and 2.
Figure 13:
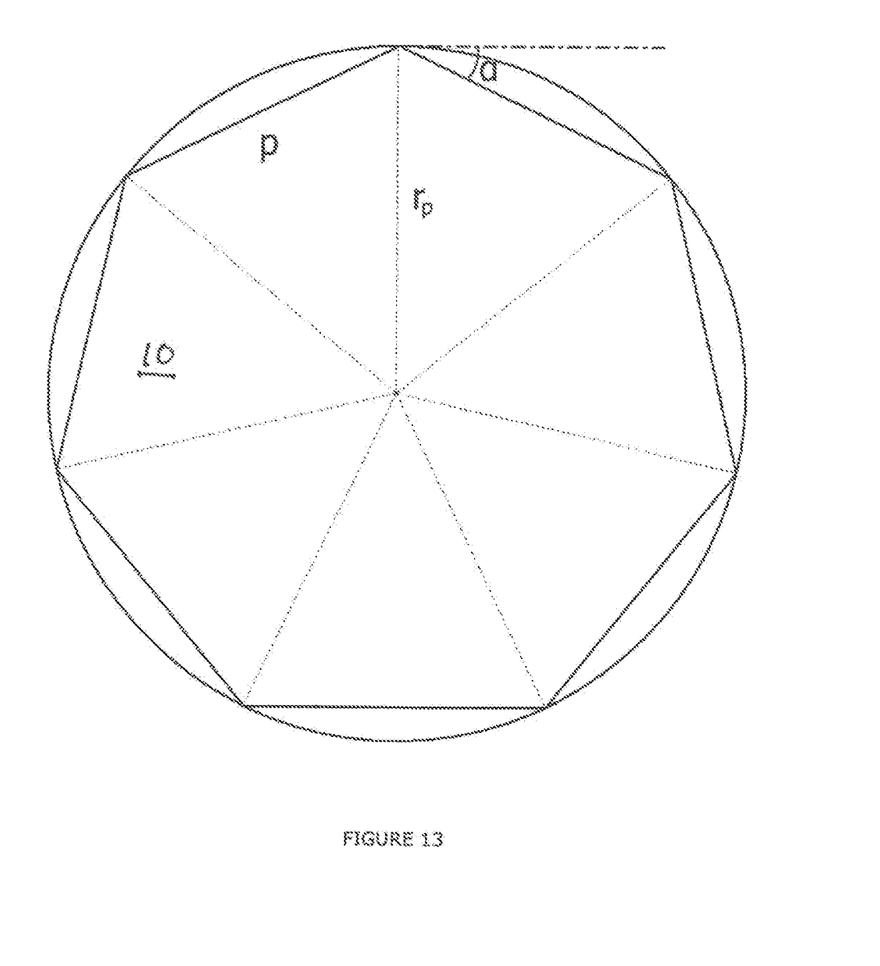

Referring now to FIGS. 12 and 13, the geometry of the sprocket will be considered in more detail.

Equations 1 & 2 below give α, the angle of articulation, and $r_p$, the pitch circle radius, for an n-toothed sprocket of pitch p.

$$\alpha = \frac{\pi}{n} \tag{1}$$

$$r_p = \frac{p}{2\sin\alpha} \tag{2}$$

The values of the arc parameters, R, x & y are given by the solutions to the set of simultaneous equations given by Equations 3 to 6, where $$\gamma = \alpha + \varphi,\ 0 < \delta < \gamma\ \&\ \gamma < \beta < \frac{\pi}{2} - \alpha.$$

$$R = r + \frac{p_2 \sin\delta}{\sin\beta - \sin\gamma} \tag{3}$$

$$x = (r - r)(\cos\gamma + \cos\beta) + p_2\cos\delta \tag{4}$$

$$\varphi = \sin^{-1}\left(\frac{2(r-r)\cos\gamma + p_2\cos\delta - x}{2r_p}\right) \tag{5}$$

$$y = r_p\cos\varphi + (R - r)\sin\gamma + \frac{p_2}{2}\sin\delta \tag{6}$$

TABLE 1

Example values for R, x & y given p, p2, r, n, β & δ

| Chain Geometry | | |
|---|---|---|
| p | 12.7 | mm |
| p2 | 7.5 | mm |
| r | 3 | mm |
| General Sprocket Geometry | | |
| n | 19 | |
| α | 0.165 | rad |
| rp | 38.58 | mm |
| Tooth Geometry Parameters | | |
| β | 0.262 to 1.466 | rad |
| δ | 0.021 to 0.102 | rad |
| Tooth Geometry | | |
| R | 1.68 to 6.62 | mm |
| x | 7.69 to 17.50 | mm |
| φ | 0.0002 to 0.0065 | rad |
| y | 60.85 to 61.68 | mm |

What is claimed is:

1. A drive sprocket comprising a plurality of integrally formed teeth for meshing with a drive member to transmit rotary motion, the drive member including a plurality of engagement pockets engaging the teeth of the drive sprocket, wherein each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface, wherein the first contact location is radially offset from the second contact location, wherein each tooth has a front face and a back face, the shape of which faces being defined by the first and second sides, wherein the shape of each face is symmetrical about a radial axis of the tooth.

2. The drive sprocket according to claim 1, wherein the sides of the faces are defined at least partially by two arcs.

3. The drive sprocket according to claim 2, wherein the two arcs each have a radius of R, the centres of the arcs being at a distance x from one another, and at a perpendicular distance, y, from the centre of the drive sprocket, and wherein the centre of each arc is at ±x/2,y.

4. The drive sprocket according to claim 1, wherein adjacent teeth are spaced apart from one another to define a connecting portion of the sprocket.

5. A transmission system comprising:
a drive sprocket; and
a drive member, which drive member is adapted to mesh with the drive sprocket,
wherein the drive sprocket comprises a plurality of integrally formed teeth for meshing with the drive member to transmit rotary motion,
wherein the drive member includes a plurality of engagement pockets engaging the teeth of the drive sprocket,
wherein each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface,
wherein the first contact location is radially offset from the second contact location,
wherein each tooth has a front face and a back face, the shape of which faces being defined by the first and second sides, and
wherein the shape of each face is symmetrical about a radial axis of the tooth.

6. The transmission system according to claim 5, wherein the second engaging surface is spaced apart from the first engaging surface, the first and second engaging surfaces forming an engagement surface pair, which pair is rotatable about a rotational axis, wherein adjacent engagement pockets are connected to one another by a connecting member.

7. The transmission system according to claim 6, wherein adjacent engagement pockets are connected to one another by a primary link, which primary link is rotatable about the rotational axis of the engagement surface pair.

8. The transmission system according to claim 7, wherein each primary link is rotatable about the rotational axis of each adjacent engagement pocket.

9. The transmission system according to claim 7, comprising a plurality of first primary links which are coplanar with one another and are pivotally connected to one another at first and second pivot points, which pivot points are spaced apart from one another such that adjacent first primary links are pivotable about the axis of rotation of each adjacent engagement pocket.

10. The transmission system according to claim 9, comprising a plurality of second primary links coplanar with one another and pivotally connected to one another at first and second pivot points, which pivot points are spaced apart from one another such that adjacent second primary links are pivotable about the axis of rotation of each adjacent engagement pocket, wherein the first primary links are connected to the second primary links such the first and second primary links are substantially parallel to one another, and the first pivot points of the first links are coaxial with the second pivot points of the second links, and the second pivot points of the first links are coaxial with the first pivot points of the second links.

11. The transmission system according to claim 7, wherein each engagement pocket comprises first and second transverse members, each having a first end and a second end, the first and second transverse members being spaced apart from one another, wherein the first and second engaging surfaces are formed on the first and second transverse members respectively.

12. The transmission system according to claim 11, wherein each engagement pocket comprises a secondary link connecting the first and second transverse members, wherein the secondary links are coplanar with one another.

13. The transmission system according to claim 12, wherein the secondary links are parallel with the primary links, and the transverse members are substantially perpendicular to the primary and secondary links.

14. The transmission system according to claim 12, wherein each engagement pocket comprises a first secondary link positioned at, or close to the first ends of the first and second transverse members, and a second secondary link positioned at, or close to the second ends of the transverse members, where in the first and second secondary links are parallel with one another.

15. The transmission system according to claim 14, wherein each engagement pocket comprises a first set of first and second primary links which are proximate the first secondary links, and a second set of primary and secondary links with are proximate the second secondary links.

16. The transmission system according to claim 15, wherein the first and second transverse members each have a radius r, wherein the distance between the first and second members of an engagement pocket is p2, and the distance between first and second pivot points of a primary link is p.

17. A drive sprocket comprising a plurality of integrally formed teeth for meshing with a drive member to transmit rotary motion, the drive member including a plurality of engagement pockets engaging the teeth of the drive sprocket, wherein each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface, wherein the first contact location is radially offset from the second contact location.

* * * * *